June 2, 1964  R. L. VAN ALLEN  3,135,911
POLARITY SENSITIVE SATURABLE CORE REACTOR
Original Filed June 24, 1960  2 Sheets-Sheet 1

INVENTOR.
ROLAND L. VAN ALLEN
BY Shanley & O'Neil
ATTORNEYS

June 2, 1964 R. L. VAN ALLEN 3,135,911
POLARITY SENSITIVE SATURABLE CORE REACTOR
Original Filed June 24, 1960 2 Sheets-Sheet 2

INVENTOR
ROLAND L. VAN ALLEN

BY *Shanley & O'Neil*

ATTORNEYS

United States Patent Office 3,135,911
Patented June 2, 1964

3,135,911
POLARITY SENSITIVE SATURABLE CORE REACTOR
Roland L. Van Allen, Seabrook, Md., assignor to Magnetics, Inc., a corporation of Pennsylvania
Continuation of application Ser. No. 38,550, June 24, 1960. This application Nov. 15, 1963, Ser. No. 325,804
9 Claims. (Cl. 323—89)

This application is a continuation of copending application Serial No. 38,550, filed June 24, 1960.

This invention relates generally to saturable-core circuitry and, more particularly, to polarity sensitive saturable-core circuitry.

The advantages of saturable-core control circuitry are well-known in the art. That the simple saturable reactor is polarity insensitive is also well-known in the art. The present invention has for an object the provision of novel saturable-core circuitry which is polarity sensitive.

Another object of the invention is the provision of saturable-core control circuitry which may be used to deliver reversible polarity D.C. signal to a load.

These objects are carried out by metering circuitry including saturable reactor means and a polarity sensing circuit inductively coupled to the saturable reactor means to produce a uni-directional signal responsive to the direction of current in a D.C. bus acting as a control winding of the saturable reactor means.

Other objects and applications of the invention will be more clearly understood from following the description taken in conjunction with the accompanying drawings in which:

FIGURE 1 is an electrical schematic diagram of saturable-core circuitry embodying the invention;

FIGURES 2a, b, c, and d are representations of the voltage wave forms found in the embodiment of FIGURE 1;

FIGURE 3 is an electrical schematic diagram of saturable-core circuitry embodying the invention;

FIGURES 4a and b are representations of voltage wave forms found in the embodiment of FIGURE 3;

Figure 1:
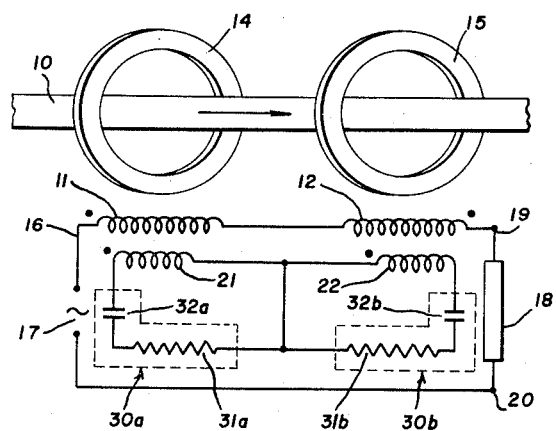

In the saturable reactor of FIGURE 1, D.C. bus 10 acts as a single-turn control winding; windings 11 and 12 link saturable cores 14 and 15, respectively, and are series-connected in the load or controlled circuit 16. The power source for the saturable reactor load circuit is A.C. source 17 and the saturable reactor load is impedance means 18. The saturable cores 14 and 15, utilizing saturation phenomena, function to control current in the saturable reactor load circuit 16. Pick-up windings 21 and 22, of equal turns, link cores 14 and 15, respectively, and are wound as indicated in FIGURE 1. It is to be noted that the pickup winding 22 is oppositely wound on core 15 with respect to control winding 12.

Figure 2A:
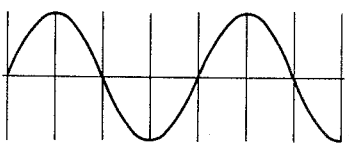
Figure 2B:
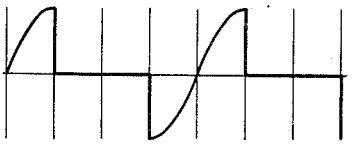
Figure 2C:
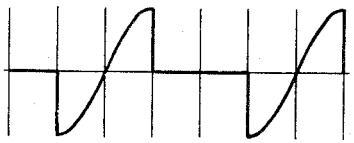
Figure 2D:
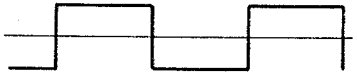

The operation of the circuit thus far set forth can be best described with reference to the wave forms set forth in FIGURES 2a, b, c, and d. FIGURE 2a is a representation of the voltage wave form of the A.C. power supply 17. FIGURE 2b is a representation of the voltage wave form across windings on core 14 when there is current in bus 10 as indicated. This wave form is similar across controlled winding 11 and pick-up winding 21. The action is as follows: prior to saturation of core 14, from 0 to 90° in the cycle of the A.C. power supply 17, supply voltage appears across winding 11 which is of very high impedance compared with load resistance. During this portion of the cycle voltage is induced in winding 21. Flux is increasing in core 14 during this portion of the cycle and saturation occurs at 90°. When core 14 saturates there is no longer flux change in the core and the voltage across winding 11 and in pick-up winding 21 drops to zero and voltage appears across the load. The output current in load impedance 18 is the flat topped wave form shown in FIGURE 2d having an amplitude equal to that required to balance the ampere turns of the control circuit, that is, single-turn control winding 10 on core 15. During the period from 90° to 270° in the full cycle, core 14 remains saturated and core 15 sustains the difference between supply voltage and load voltage; this voltage appearing across winding 12 and in pick-up winding 22. At 270° in the cycle, core 15 in which the flux has been changing, reaches negative saturation level. Instantaneously, load current is no longer limited by the ampere-turns balance between the control circuit and the load circuit and because of the negative supply voltage, the load current reverses polarity. Core 14 then sustains the difference between supply voltage and load voltage. The circuit action in each half cycle is identical with the two cores changing roles when the supply voltage reverses. At 90° in the next full cycle core 14 saturates again and the action is repeated. FIGURE 2c is a representation of the voltage wave form induced in pick-up winding 22. As pick-up winding 22 is oppositely wound on core 15 with respect to controlled winding 12, the wave form (not shown) across controlled winding 12 would be similar in some characteristics to that of pick-up winding 22 but inverted.

Referring to FIGURE 1, an RC network is connected to each pick-up winding 21 and 22. The RC network 30a connected to pick-up winding 21 includes resistor 31a and capacitor 32a. The RC network 30b connected to pick-up winding 22 includes resistor 31b and capacitor 32b. These networks differentiate the input voltage to produce an output voltage which is proportional to the rate of change of the input voltage. In this case, each RC network differentiates the wave form across its respective pick-up winding to produce uni-directional pulses across its respective resistor. The voltage input to RC network 30a has the wave form of FIGURE 2b. RC network 30b is a differentiating circuit which produces an output voltage proportional to the rate of change of the input signal. The input signal of differentiating circuit 30a is the voltage induced in winding 21 as shown in FIGURE 2b and previously described. This input voltage increases gradually from zero degrees to 90° in the cycle and at 90° drops suddenly to zero and remains at this level until 270° in the cycle. At 270°, the input voltage suddenly increases to a maximum and thereafter gradually decreases to zero at 360° in the cycle. From this it can be seen that the maximum rate of change occurs at 90° and 270° and that the change at each is in the same direction. The differentiating circuit 30a output is determined by this maximum rate of voltage change occurring at 90° and 270° and a series of uni-directional output pulses is produced across 31a. The voltage input to RC network 30b has the wave form of FIGURE 2c and a series of uni-directional output pulses across resistor 31b is similarly produced.

The chopped wave forms induced in pick-up windings 21 and 22, as shown in FIGURES 2b and 2c respectively, are typical over nearly the entire operating range with current in bus 10 as indicated. When bus current is reversed, these chopped wave forms are correspondingly reversed and a series of opposite polarity uni-directional pulses will be produced across the respective resistors 31a and 31b in the RC networks. Thus the reversal of wave forms provides a unique indication of the direction of current in bus 10 not otherwise available, for, it has been found that with the reversal of the direction of current in bus 10 there is no significant change in the phase of the square wave (FIGURE 2d) across impedance 18 and, regardless of direction of current, the saturable reactor output (across impedance 18) remains proportional to the magnitude of current in the bus 10.

Figure 4A:
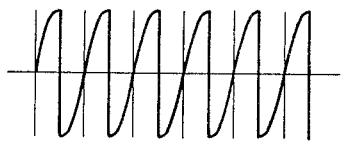
Figure 3:
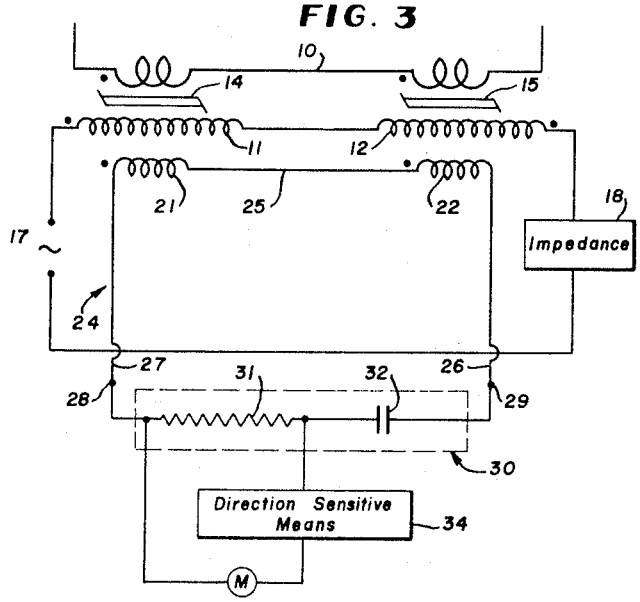

Referring to FIGURE 3, pick-up windings 21 and 22 are additively connected in the circuit 24 which includes leads 25, 26, and 27. The voltage wave form resulting from the additive connection of the pick-up windings 21 and 22 is a second harmonic, i.e. twice the frequency of the A.C. supply voltage 17. The resultant wave form read across resistor 31 is illustrated in FIGURE 4a.

Figure 4B:

Circuit 24 of FIGURE 3 includes an RC network 30 made up of a resistor 31 and a capacitor 32. The RC network 30 will differentiate the additive voltage across pick-up windings 21 and 22 (FIGURE 4a) to produce an output voltage across resistor 31 which is proportional to the rate of change of the additive input voltage. With current as indicated, the output voltage across resistor 31 is a series of uni-directional pulses illustrated in FIGURE 4b. With a reversal of the direction of current in the control winding, D.C. conductor 10, the resultant wave form across pick-up windings 21 and 22 is inverted and a series of opposite polarity uni-directional pulses will be produced across the resistor 31.

Figure 5:
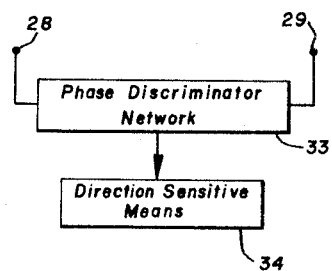
FIGURE 5 is a schematic diagram of electrical apparatus to be used with the circuitry of FIGURE 3.

In FIGURE 5 a phase discriminator network 33, of any suitable conventional design, is connected into circuit 24 at terminals 28 and 29 in place of the RC network 30. The phase discriminator network 33 acts in the well-known manner to produce uni-directional pulses responsive to the phase of the voltage wave form induced in the pick-up windings 21 and 22.

The uni-directional pulse output of the RC network 30 or the phase discriminator network 33 may be connected to any well-known direction sensitive switch or relay means 34, which may include indicator means if visual indication of the direction of current in bus 10 is desired. The direction sensitive means 34 may also include any suitable switching or gating means to further utilize the uni-directional pulses in the control of processes or apparatus responsively to the direction of current in the control winding 10 of the saturable reactor.

Figure 6:
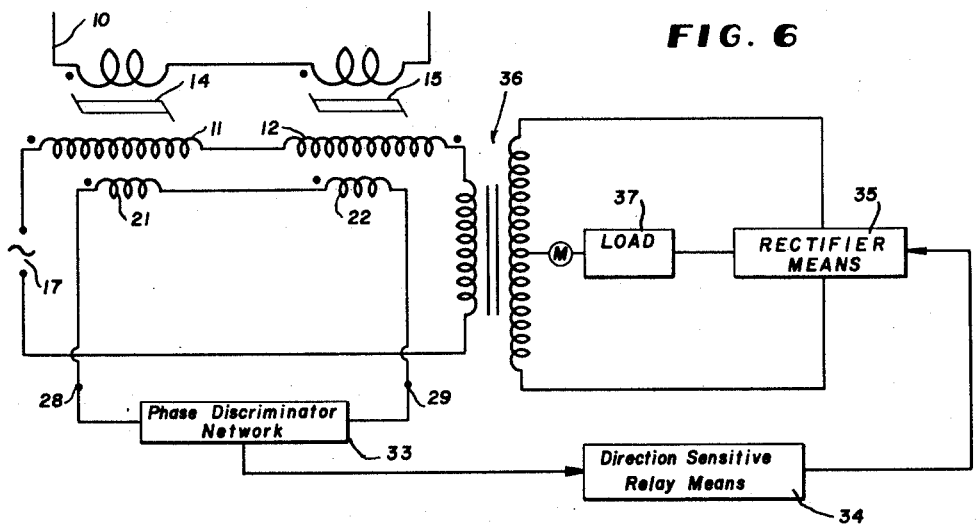
FIGURE 6 is a schematic diagram of saturable-core circuitry embodying the invention.
Figure 6:
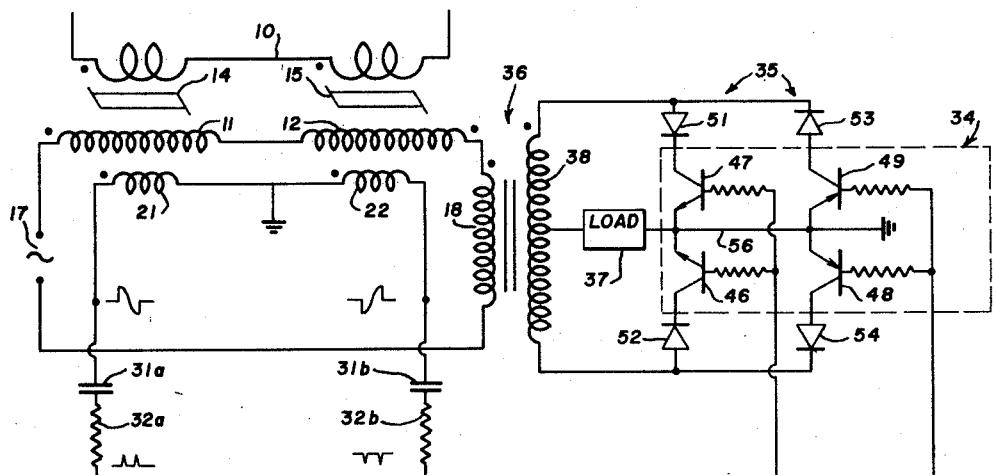

Referring to FIGURE 6, the direction sensitive relay means 34 is used to gate a rectifier means 35. The rectifier means 35 is coupled to the saturable reactor load circuit via a center-tap transformer 36. The direction sensitive means 34 gates the rectifier means 35 to deliver the desired polarity direct current to a load means 37 responsively to the direction of current in the control winding 10.

Figure 7:
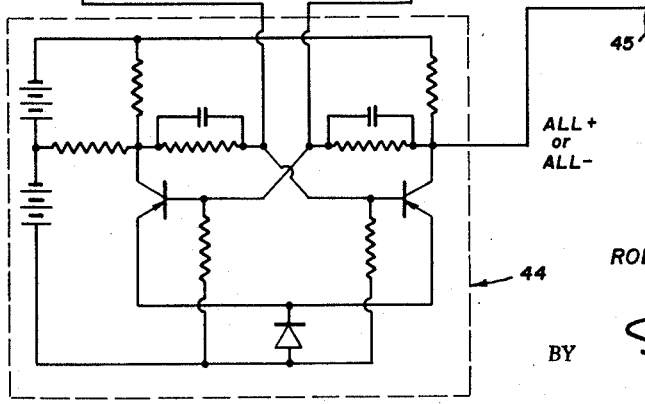
FIGURE 7 is an electrical schematic diagram of a specific embodiment of the invention.

In the embodiment of FIGURE 7, the voltages induced in pick-up windings 21 and 22 are again used individually. An RC network is connected to each pick-up winding and the resulting series of pulses (positive from pick-up winding 21, and negative from pick-up winding 22) are used to steer any suitable bi-stable circuit such as flip-flop 44. Bi-stable flip-flop 44 receives a positive and negative pulse each half cycle (of the A.C. power supply 17) which maintains the flip-flop in one of its stable states for a given direction of current in conductor 10; even though the A.C. power supply may have a severe transient or may be interrupted, within one half cycle, the stable state is restored. Since the operation of bi-stable circuits is conventional and well-known, no further description is deemed necessary for an understanding of the invention. The polarized output of bi-stable flip-flop 44 is connected by lead 45 to the direction sensitive switch means 34. In this embodiment, the direction sensitive switch means includes NPN transistors 46 and 47 and PNP transistors 48 and 49. The direction sensitive switch means 34 are connected so as to gate the rectifier means 35 which includes rectifiers 51, 52, 53, and 54. Rectifier means 35 supplies current to the load 37 via load common 56.

In the operation of the direction sensitive switching means and rectifier means of this embodiment, the secondary 38 of center-tap transformer 36 supplies two gated full wave rectifier circuits. The first gated rectifier circuit includes the center-tap secondary 38, the rectifier 51, NPN transistor 47, load 37, rectifier 52 and NPN transistor 46. The second gated rectifier circuit includes center-tap secondary 38, rectifier 53, PNP transistor 49, load 37 via load common connector 56, rectifier 54 and PNP transistor 48. The transistor switches gate one or the other of the full wave rectifiers. When the output from flip-flop 44 is positive, NPN transistors 46 and 47 are on and PNP transistors 48 and 49 are off. When the output from multi-vibrator 44 is negative, the PNP transistors 48 and 49 are on and the NPN transistors 46 and 47 are off. As discussed earlier, the polarity of the output of flip-flop 44 is determined by the direction of current in conductor 10. The direction sensitive switching means 34 is responsive to the polarity of the output of the flip-flop to gate one or the other of the full wave rectifiers. The full wave rectifiers determine the direction of current in the load means 37. And, as the magnitude of the saturable reactor output is proportional to the magnitude of current in conductor 10, it can be seen that the direction and magnitude of current in load 37 can be determined by the direct current flowing in the control windings 10 of the saturable reactor.

It is to be understood that any embodiment of the invention herewith shown or described is not to be considered as a limitation on the invention, as various changes in these circuits and apparatus may be resorted to without departing from the spirit of the invention. For example, while the relay means of FIGURE 7 includes a flip-flop and transistor switching means, other elements may be substituted or some elements could be eliminated. As an example of the latter, a less reliable combination could be obtained by eliminating the flip-flop, utilizing a polarity sensing circuit including only one pick-up winding, differentiating the induced voltage of this pick-up winding, and using the resultant pulse to steer a direction sensitive switching means.

The invention provides a simplified, polarity sensitive, saturable-core circuit which may be used for either metering or control. While the foregoing description is representative of the invention, the invention may be practiced otherwise than as set forth. Therefore, reference shall be had to the appended claims to define the limits of the invention.

What is claimed is:

1. Saturable-core circuitry comprising single ended saturable reactor means including saturable core means, an A.C. power winding, and a D.C. control winding; and polarity sensing circuit means inductively coupled to the saturable core means to produce uni-directional pulses the polarity of which is responsive to the direction of D.C. in the control winding and the frequency of which is responsive to the frequency of A.C. in the power winding.

2. Polarity responsive circuit comprising a high impedance D.C. source; an A.C. source; a simple magnetic amplifier having saturable core means, a controlled winding, and a control winding, the control winding being connected to the D.C. source and the controlled winding being powered by the A.C. source; polarity sensing circuit means inductively coupled to the saturable core means to produce a unidirectional signal which is responsive to the direction of current in the control winding, and direction sensitive means responsive to the unidirectional signal.

3. Polarity responsive circuit comprising a high impedance D.C. source; an A.C. source; a simple magnetic amplifier having saturable core means, a controlled winding, and a control winding, the control winding being connected to the A.C. source; phase discriminator circuit means inductively coupled to the saturable core means to produce a undirectional signal which is respective to the direction of current flow in the control winding; and direction sensitive means responsive to the uni-directional signal.

4. Polarity responsive device comprising a high impedance D.C. source; an A.C. source; a simple magnetic amplifier having saturable core means, controlled winding means, and control winding means, the A.C. winding means being powered by the A.C. source and the D.C. winding means being connected to the D.C. source; differentiating circuit means inductively coupled to the saturable core means to produce a unidirectional signal indicative of the direction of D.C. in the winding means; and direction sensitive means responsive to the uni-directional signal for metering the D.C. source.

5. Saturable core circuitry comprising a simple magnetic amplifier including saturable core means defining a pair of saturable paths and balanced control and power windings inductively coupled to each saturable path, and polarity sensitive circuit means inductively coupled to the saturable core means to produce uni-directional pulses representative of the direction of current in the control winding of the simple magnetic amplifier.

6. Polarity sensitive circuitry comprising a simple magnetic amplifier including saturable core means defining a pair of saturable paths and balanced control and power windings inductively coupled to each saturable path, and discriminator circuit means inductively coupled to the saturable core means to produce a uni-directional signal representative of the direction of current in the control winding of the simple magnetic amplifier.

7. Polarity sensitive circuit comprising a simple magnetic amplifier including saturable core means defining a pair of saturable paths and balanced control and power windings inductively coupled to each saturable path; and differentiating circuit means inductively coupled to the saturable core means to produce a uni-directional signal responsive to the direction of current in the control winding of the simple magnetic amplifier.

8. Magnetic control device comprising a source of D.C.; a source of A.C.; a simple magnetic amplifier including saturable core means, power winding means connected in a load circuit powered by the A.C. source, and control winding means powered by the D.C. source; polarity sensing circuit means inductively coupled to the saturable core means to produce a uni-directional output responsive to the direction of current in the control winding means; rectifier means coupled to the load circuit of the simple magnetic amplifier; load means connected to the rectifier means; and direction sensitive relay circuit means connected to the polarity sensing circuit means and the rectifier means to control the polarity of rectified current delivered to the load means responsively to the direction of current in the control winding means.

9. Device for delivering reversible polarity D.C. to a load comprising an A.C. voltage source, a simple magnetic amplifier for regulating voltage delivered by the A.C. source including saturable core means, power winding means in circuit with the A.C. source, and control winding means, polarity sensing circuit means inductively coupled to the saturable core means to produce a uni-directional output directionally responsive to current in the control winding means, and gateable restifying circuit means coupled to the A.C. source through the simple magnetic amplifier and connected to the polarity sensing circuit means to deliver D.C. directionally responsive to the uni-directional output of the polarity sensing means.

References Cited in the file of this patent

UNITED STATES PATENTS

| 2,666,178 | Kramer | Jan. 12, 1954 |
| 2,712,635 | Borg | July 5, 1955 |
| 2,722,654 | Sikorra | Nov. 1, 1955 |
| 2,835,827 | Kramer | May 20, 1958 |
| 2,926,300 | Mamon | Feb. 23, 1960 |

FOREIGN PATENTS

| 534,667 | Great Britain | Mar. 13, 1941 |